(12) United States Patent
Buduma et al.

(10) Patent No.: US 7,738,385 B2
(45) Date of Patent: Jun. 15, 2010

(54) MIRRORING OF DATA IN A NETWORK DEVICE

(75) Inventors: Venkateshwar Buduma, San Jose, CA (US); Chien-Hsien Wu, Cuppertino, CA (US)

(73) Assignee: Broadcom Corporation, Irvine, CA (US)

( * ) Notice: Subject to any disclaimer, the term of this patent is extended or adjusted under 35 U.S.C. 154(b) by 1166 days.

(21) Appl. No.: 11/252,562

(22) Filed: Oct. 19, 2005

(65) Prior Publication Data

US 2006/0114831 A1 Jun. 1, 2006

Related U.S. Application Data

(60) Provisional application No. 60/631,570, filed on Nov. 30, 2004.

(51) Int. Cl.
*H04L 12/26* (2006.01)
(52) U.S. Cl. .................. 370/241; 370/390; 709/227
(58) Field of Classification Search ............... 370/390, 370/389, 392, 231, 245; 709/227, 10
See application file for complete search history.

(56) References Cited

U.S. PATENT DOCUMENTS

| | | | | |
|---|---|---|---|---|
| 4,651,318 A | * | 3/1987 | Luderer | ...................... 370/422 |
| 4,881,074 A | * | 11/1989 | Reichbauer et al. | ......... 370/258 |
| 5,243,596 A | * | 9/1993 | Port et al. | .................... 370/231 |
| 5,406,322 A | * | 4/1995 | Port et al. | ................ 348/14.07 |
| 5,640,393 A | * | 6/1997 | Lo et al. | ..................... 370/392 |
| 5,892,922 A | | 4/1999 | Lorenz | |
| 6,016,310 A | | 1/2000 | Muller et al. | |
| 6,041,042 A | * | 3/2000 | Bussiere | ..................... 370/245 |
| 6,222,841 B1 | | 4/2001 | Taniguchi | |
| 6,425,015 B1 | | 7/2002 | Jennings et al. | |
| 6,496,502 B1 | * | 12/2002 | Fite et al. | ..................... 370/389 |
| 7,031,304 B1 | * | 4/2006 | Arberg et al. | ............... 370/360 |
| 7,292,573 B2 | * | 11/2007 | LaVigne et al. | ............. 370/390 |
| 2003/0118016 A1 | * | 6/2003 | Kalkunte et al. | ............ 370/389 |
| 2004/0213232 A1 | * | 10/2004 | Regan | ........................ 370/390 |
| 2006/0059163 A1 | * | 3/2006 | Frattura et al. | ................ 707/10 |
| 2006/0114831 A1 | * | 6/2006 | Buduma et al. | ............. 370/241 |
| 2006/0143300 A1 | * | 6/2006 | See et al. | ..................... 709/227 |

\* cited by examiner

*Primary Examiner*—Albert T Chou

(57) ABSTRACT

A network device for processing packets includes an ingress module for performing switching functions on an incoming packet, a memory management unit for storing packets and performing resource checks on each packet and an egress module for performing packet modification and transmitting a modified packet to an appropriate egress port. The egress module is configured to send an unmodified version of the incoming packet to an ingress mirrored-to-port when an ingress port, upon which the incoming packet is received, is configured to mirror packets received by the ingress port.

19 Claims, 6 Drawing Sheets

MIRRORING OF DATA IN A NETWORK DEVICE

CROSS-REFERENCE TO RELATED APPLICATIONS

This application claims priority of U.S. Provisional Patent Application Ser. No. 60/631,570, filed on Nov. 30, 2004. The subject matter of this earlier filed application is hereby incorporated by reference.

BACKGROUND OF THE INVENTION

1. Field of the Invention

The present invention relates to a network device in a data network and more particularly to the mirroring of data received by a network device.

2. Description of the Related Art

A packet switched network may include one or more network devices, such as an Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

As part of the management of the network device, often the packet flow needs to be monitored to determine if the network device is functioning properly. In prior art devices, the packets being sent to a given port could be "mirrored" to another port where the packet flow could be examined. The mirroring process is important in that the flow of the packets to a given destination port need not be interrupted to examine the flow to that destination port. The packets that are received by the "mirrored-to" port are examined at the latter port with no disruption to the flow of packets to the actual destination port.

Previously, for most prior art network devices, for a destination or source port, only one mirrored-to port could be specified. Given that mirroring was primarily used for monitoring of traffic received by that port, having multiple mirrored-to ports was not needed. However, mirroring has been used more recently to allow for other operations than mere static monitoring. Thus, there is a need for a network device to mirror packets to multiple ports.

Additionally, the packet that was mirrored was modified as a consequence of its being forwarded. Thus, if a packet received at a given port of a network device is forwarded to another port, the header may be modified to aid in that forwarding operation. However, if that receiving port is supposed to mirror packets to another mirrored-to port, the packet that is forwarded to the destination port is not the same as the packet that the receiving port received. This can be a problem if a copy of the received packet is what is needed at the mirrored-to port.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
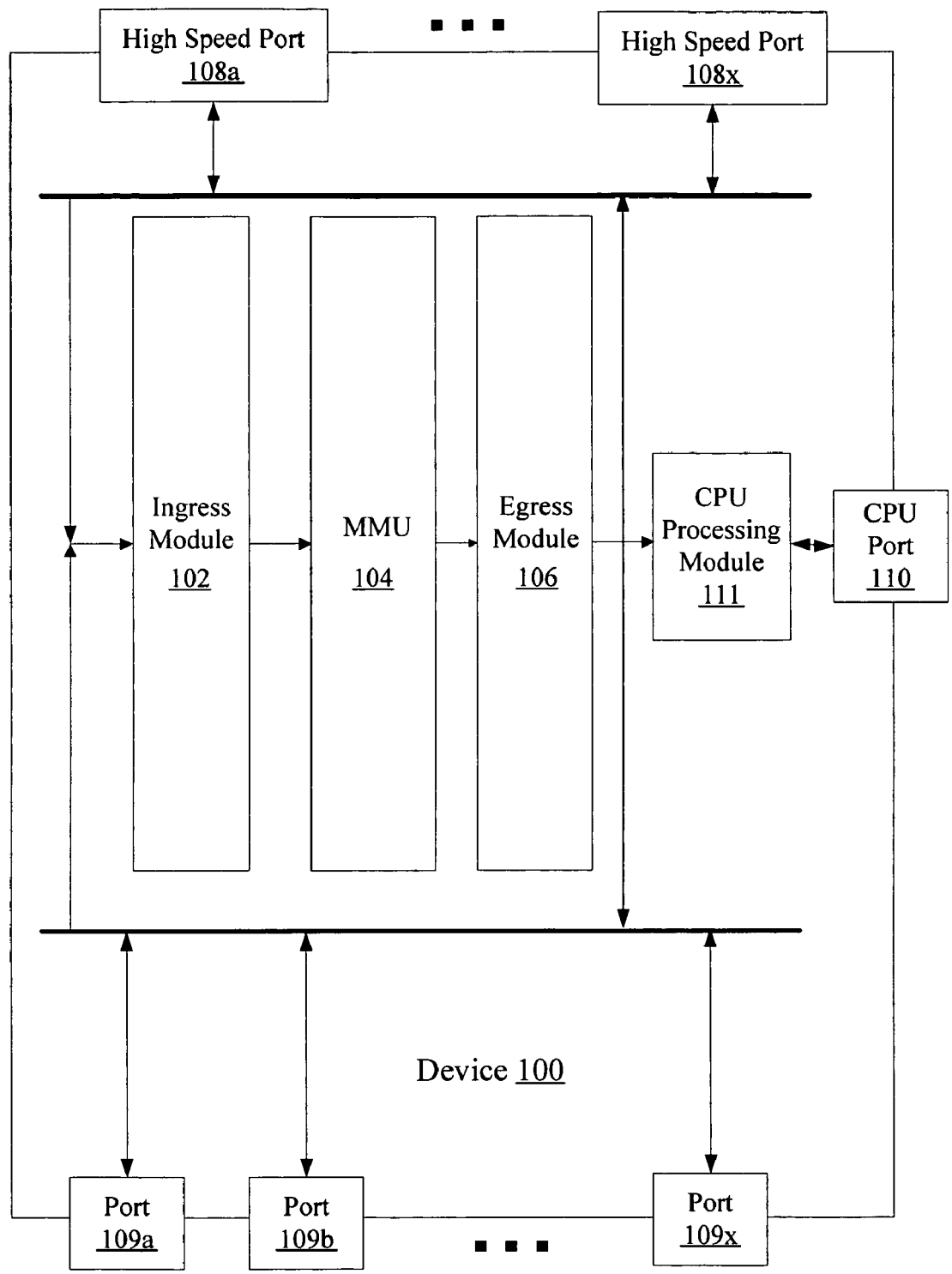
FIG. 1 illustrates a network device in which an embodiment of the present invention may be implemented.

FIG. 1 illustrates a network device, such as a switching chip, in which an embodiment of the present invention may be implemented. Device 100 includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 includes multiple cycles for processing instructions generated by that module. Device 100 implements a pipelined approach to process incoming packets. The device 100 has the ability of the pipeline to process, according to one embodiment, one packet every clock cycle. According to one embodiment of the invention, the device 100 includes a 133.33 MHz core clock. This means that the device 100 architecture is capable of processing 133.33 M packets/sec.

Device 100 may also include one or more internal fabric high speed ports, for example a HiGig™, high speed, port, 108a-108x, one or more external Ethernet ports 109a-109x, and a CPU port 110. High speed ports 108a-108x are used to interconnect various network devices in a system and thus form an internal switching fabric for transporting packets between external source ports and one or more external destination ports. As such, high speed ports 108a-108x are not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports 109a-109x. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global trunk group identifier (TGID). According to an embodiment, device 100 can support up to 128 trunk ports, with up to 8 members per trunk port, and up to 29 external physical ports. Destination ports 109a-109x on device 100 may be physical external Ethernet ports or trunk ports. If a destination port is a trunk port, device 100 dynamically selects a physical external Ethernet port in the trunk by using a hash to select a member port. The dynamic selection enables device 100 to allow for dynamic load sharing between ports in a trunk.

Once a packet enters device 100 on a source port 109a-109x, the packet is transmitted to ingress module 102 for processing. Packets may enter device 100 from a XBOD or a GBOD. The XBOD is a block that has one 10 Gigabit Ethernet (GE)/12G MAC and supports packets from high speed ports 108a-108x. The GBOD is a block that has 12 10/100/1G MAC and supports packets from ports 109a-109x.

Figure 2:
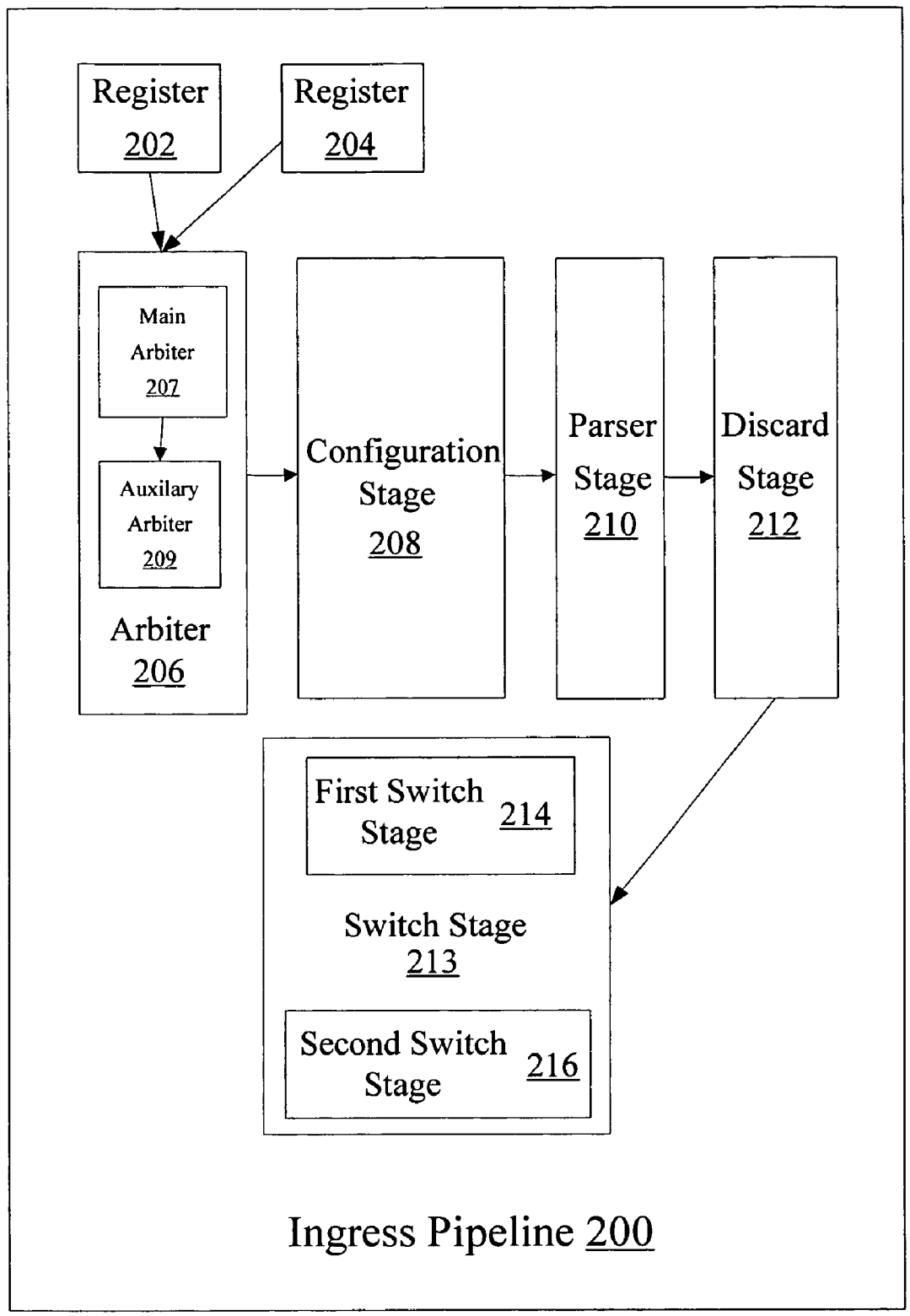
FIG. 2 illustrates a centralized ingress pipeline architecture, according to one embodiment of the present invention.

FIG. 2 illustrates a centralized ingress pipeline architecture 200 of ingress module 102. Ingress pipeline 200 processes incoming packets, primarily determines an egress bitmap and, in some cases, figures out which parts of the packet may be modified. Ingress pipeline 200 includes a data holding register 202, a module header holding register 204, an arbiter 206, a configuration stage 208, a parser stage 210, a discard stage 212 and a switch stage 213. Ingress pipeline 200 receives data from the XBOD, GBOD or CPU processing module 111 and stores cell data in data holding register 202. Arbiter 206 is responsible for scheduling requests from the GBOD, the XBOD and CPU. Configuration stage 208 is used for setting up a table with all major port-specific fields that are required for switching. Parser stage 210 parses the incoming packet and a high speed module header, if present, handles tunnelled packets through Layer 3 (L3) tunnel table lookups, generates user defined fields, verifies Internet Protocol version 4 (IPv4) checksum on outer IPv4 header, performs address checks and prepares relevant fields for downstream lookup processing. Discard stage 212 looks for various early discard conditions and either drops the packet and/or prevents it from being sent through pipeline 200. Switching stage 213 performs all switch processing in ingress pipeline 200, including address resolution.

According to one embodiment of the invention, the ingress pipeline includes one 1024-bit cell data holding register 202 and one 96-bit module header register 204 for each XBOD or GBOD. Data holding register 202 accumulates the incoming data into one contiguous 128-byte cell prior to arbitration and the module header register 204 stores an incoming 96-bit module header for use later in ingress pipeline 200. Specifically, holding register 202 stores incoming status information, including a Start cell Of Packet (SOP) signal, an End cell Of Packet (EOP) field, a purge field for indicating that the packet should be purged, a statistic update field for indicating that statistic counters should be updated for a particular packet, a high speed field for indicating that the associated packet arrived at a high speed port, a pause packet field for indicating if a current high speed packet is a pause packet, a cell byte count field for indicating the total bytes accumulated for the cell and a source port field. As is apparent to one skilled in the art, holding register 202 may store other fields not specifically identified above.

Ingress pipeline 200 schedules requests from the XBOD and GBOD every six clock cycles and sends a signal to each XBOD and GBOD to indicate when the requests from the XBOD and GBOD will be scheduled. CPU processing module 111 transfers one cell at a time to ingress module 102 and waits for an indication that ingress module 102 has used the cell before sending subsequent cells. Ingress pipeline 200 multiplexes signals from each of XBOD, GBOD and CPU processing based on which source is granted access to ingress pipeline 200 by arbiter 206. Upon receiving signals from the XBOD or GBOD, a source port is calculated by register buffer 202, the XBOD or GBOD connection is mapped to a particular physical port number on device 100 and register 202 passes information relating to a scheduled cell to arbiter 206.

When arbiter 206 receives information from register buffer 202, arbiter 206 may issue at least one of a packet operation code, an instruction operation code or a FP refresh code, depending on resource conflicts. According to one embodiment, the arbiter 206 includes a main arbiter 207 and auxiliary arbiter 209. The main arbiter 207 is a time-division multiplex (TDM) based arbiter that is responsible for scheduling requests from the GBOD and the XBOD, wherein requests from main arbiter 207 are given the highest priority. The auxiliary arbiter 209 schedules all non XBOD/GBOD requests, including CPU packet access requests, CPU memory/register read/write requests, learn operations, age operations, CPU table insert/delete requests, refresh requests and rate-limit counter refresh request and auxiliary arbiter's 209 requests are scheduled based on available slots from main arbiter 207.

When the main arbiter 207 grants an XBOD or GBOD a slot, the cell data is pulled out of register 202 and sent, along with other information from register 202, down ingress pipeline 200. The XBOD/GBOD provides certain status bits, for example SOP, EOP and MOP status bits, to main arbiter 207 that it uses to schedule the XBOD/GBOD requests and resolve any arbitration conflicts with auxiliary arbiter 209. After scheduling the XBOD/GBOD cell, main arbiter 207 forwards certain status bits, for example SOP, EOP and MOP status bits, to auxiliary arbiter 209.

The auxiliary arbiter 209 is also responsible for performing all resource checks, in a specific cycle, to ensure that any operations that are issued simultaneously do not access the same resources. As such, auxiliary arbiter 209 is capable of scheduling a maximum of one instruction operation code or packet operation code per request cycle. According to one embodiment, auxiliary arbiter 209 implements resource check processing and a strict priority arbitration scheme. The resource check processing looks at all possible pending requests to determine which requests can be sent based on the resources that they use. Resources of ingress pipeline 200 are separated into lookup resources for SOP cells, MMU access for all cells, EOP resources for EOP cells and L2_MOD_FIFO resource for Layer 2 (L2) operations. The L2_MOD_FIFO resource is a 16 entry table that is used for tracking all updates to a Layer 2 (L2) table. Since the L2_MOD_FIFO resource is limited, auxiliary arbiter 209 restricts certain operations once the L2_MOD_FIFO resource is full. Additionally, auxiliary arbiter 209 may not schedule access to any address resolution processing faster than once every three clock cycles.

The strict priority arbitration scheme implemented in an embodiment of the invention requires that CPU access requests are given the highest priority, CPU packet transfer requests are given the second highest priority, rate refresh requests are given the third highest priority, CPU memory reset operations are given the fourth highest priority and Learn and age operations are given the fifth highest priority by auxiliary arbiter 209. Upon processing the cell data, auxiliary arbiter 209 transmits packet signals, including SOP and LOP, the 1024 bit packet cell data, a L2-MOD-FIFO lock bit, instruction operation code information and instruction write data to configuration stage 208. As is apparent to one skilled in the art, the arbiter may transmit other types and/or configurations of information to configuration stage 208.

Configuration stage 208 includes a port table for holding all major port specific fields that are required for switching, wherein one entry is associated with each port. The configuration stage 208 also includes several registers. When the configuration stage 208 obtains information from arbiter 206, the configuration stage 208 sets up the inputs for the port table during a first cycle and multiplexes outputs for other port specific registers during a second cycle. At the end of the second cycle, configuration stage 208 sends output, including SOP, EOP, MOP, PURGE and statistic update, to parser stage 210.

Parser stage 210 manages an ingress pipeline buffer which holds the 128-byte cell as lookup requests traverse pipeline 200. When the lookup request reaches the end of pipeline 200, the data is pulled from the ingress pipeline buffer and sent to MMU 104. If the packet is received on a high speed port, a 96-bit module header accompanying the packet is parsed by parser stage 210.

Figure 3:
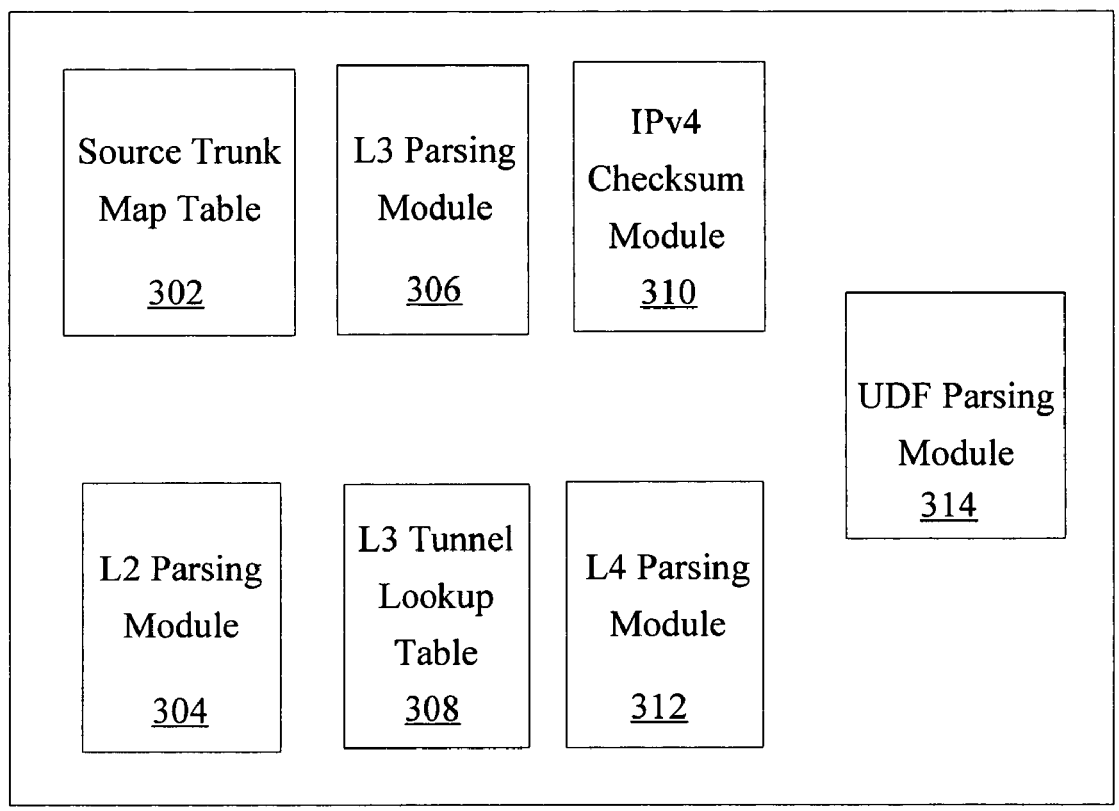
FIG. 3 illustrates the components of the parser stage, according to one embodiment of the present invention.

FIG. 3 illustrates the components of parser stage 210. According to FIG. 3, parser stage 210 includes a source trunk map table 302, a L2 parsing module 304, a Layer 3 (L3) parsing module 306, a L3 Tunnel lookup module 308, an IPv4 checksum module 310, a Layer 4 (L4) parsing module 312 and a user defined field (UDF) parsing module 314. The source trunk map table 302 is used by parser stage 210 for source hunk resolution. L2 parsing module 304 supports parsing of different types of layer 2 encapsulations, including Ethernet II, 802.3, SNAP and 802.3 LLC packet types. L3 parsing module 306 supports parsing of different types of L3 encapsulations, including IPv4 packets with or without options, IPv6 packets and ARP packets. Additionally, L3 parsing module 306 supports parsing tunneled packets to enable IP-in-IP and IPv6 over IPv4 tunneling. L3 tunnel lookup module 308 includes a 128 entry TCAM L3 tunnel table to enable parser 212 to determine if the incoming packet is a tunneled IPv4 packet. IPv4 checksum module 310 verifies the IPv4 checksum on the outer IPv4 header and checks the IPv4 checksum on an outer IPv4 header with or without options. L4 parsing module 312 supports L4 parsing and UDF parsing module 314 supports user defined fields parsing for allowing users to match on arbitrary fields within the first 128 bytes of the packet.

After all fields have been parsed, parser stage 210 writes the incoming cell data to the ingress pipeline buffer and passes a write pointer down the pipeline. Since the packet data is written to the ingress pipeline buffer, the packet data need not be transmitted further and the parsed module header information may be dropped. Discard stage 212 then looks for various early discard conditions and drops the packet and/or prevents it from being sent through the chip.

Switching stage 213 performs address resolution processing and other switching on incoming packets. According to an embodiment of the invention, switching stage 213 includes a first switch stage 214 and a second switch stage 216. First switch stage 214 resolves any drop conditions, performs BPDU processing, checks for L2 source station movement and resolves most of the destination processing for L2 and L3 unicast packets, L3 multicast packets and IPMC packets. The first switch stage 214 also performs protocol packet control switching by optionally copying different types of protocol packets to the CPU or dropping them. The first switch stage 214 further performs all source address checks and determines if the L2 entry needs to get learned or re-learned for station movement cases. The first switch stage 214 further performs destination calls to determine how to switch packets based on a destination switching information. Specifically, the first switch stage 214 figures out the destination port for unicast packets or port bitmap of multicast packets, calculates a new priority, optionally traps packets to the CPU and drops packets for various error conditions. The first switch stage 214 also includes a DSCP_Table for mapping an incoming IPv4 or IPv6 DSCP to a new value. The first switch stage 214 further includes rate limiting counters that provide the ability to program specific rates for multicast, broadcast and DLF traffic. The first switch stage 214 handles high speed switch processing separate from switch processing for ports 109a-109x and switches the incoming high speed packet based on the stage header operation code.

The second switch stage 216 then performs FP action resolution, source port removal, trunk resolution, high speed trunking, port blocking, CPU priority processing, end-to-end Head of Line (HOL) resource check, resource check, mirroring, maximum transfer length (MTU) checks for verifying that the size of incoming/outgoing packets is below a maximum transfer length. The second switch stage 216 takes first switch stage 216 switching decision, any L3 routing information and FP redirection to produce a final destination for switching. The second switch stage 216 also removes the source port from the destination port bitmap and performs trunk resolution processing for resolving the trunking for the destination port for unicast packets, the ingress mirror-to-port and the egress mirror-to-port. The second switch stage 216 also performs high speed trunking by checking if the source port is part of a high speed trunk group and, if it is, removing all ports of the source high speed trunk group. The second switch stage 216 further performs port blocking by performing masking for a variety of reasons, including meshing and egress masking. The second switch stage 216 also determines priority/Class of Service for packets that are being sent to the CPU. The second switch stage 216 further performs resource checks before mirroring to generate an accurate port bitmap for egress mirroring and to remove any resource-limited ports that might have been added by mirroring. The second switch stage 216 then outputs the p-bus fields and the cell data to MMU 104. The p-bus fields indicate to egress stage 106 how to switch and modify the packet.

Upon receiving the packet from MMU 104, egress module 106 supports multiple egress functions for a 72 gigabyte port bandwidth and a CPU processing bandwidth. According to one embodiment, the egress module 106 is capable of handling more than 72 Gig of traffic, i.e., 24 one GE ports, 4 high speed ports (12G) and a CPU processing port of 0.2GE. The egress module 106 receives original packets, as inputted from Ethernet ports 109a-109x, from MMU 104, and may either transmit modified or unmodified packets to destination ports 109a-109x. According to one embodiment of the invention, all packet modifications within device 100 are made in egress module 106 and the core processing of egress module 106 is capable of running faster than the processing of destination ports 109a-109x. Therefore, egress module 106 provides a stall mechanism on a port basis to prevent ports 109a-109x from becoming overloaded and thus services each port based on the speed of the port.

In an embodiment of the invention, the egress module 106 is connected to the MMU 104 by a 1024 bits data interface and all packets transmitted from the MMU 104 pass through egress module 106. Specifically, the MMU 104 passes unmodified packet data and control information to egress module 106. The control information includes the results of table lookups and switching decisions made in ingress module 102. The data bus from MMU 106 is shared across all ports 108 and 109 and the CPU processing 111. As such, the bus uses a "request based" Time Division Multiplexing (TDM) scheme, wherein each Gig port has a turn on the bus every 72 cycles and each high speed Port 108 has a turn every 6 cycles. CPU processing packet data is transmitted over bubbles—free spaces occurring on the bus. Upon receiving the information for the MMU 104, the egress module 106 parses the packet data, performs table lookups, executes switch logic, modifies, aligns and further buffers the packet before the data is transmitted to the appropriate destination port 109a-109x.

The egress module 106 is connected to the CPU processing module 111 through a 32 bit S-bus interface which the CPU uses to send requests to egress module 106. The requests are typically for reading the egress module's resources, i.e., registers, memories and/or stat counters. Upon receiving a request, the egress module 106 converts the request into a command and uses a mechanism, described in detail below, for storing and inserting CPU instructions into a pipeline wherever there is an available slot on the pipeline.

Figure 4:
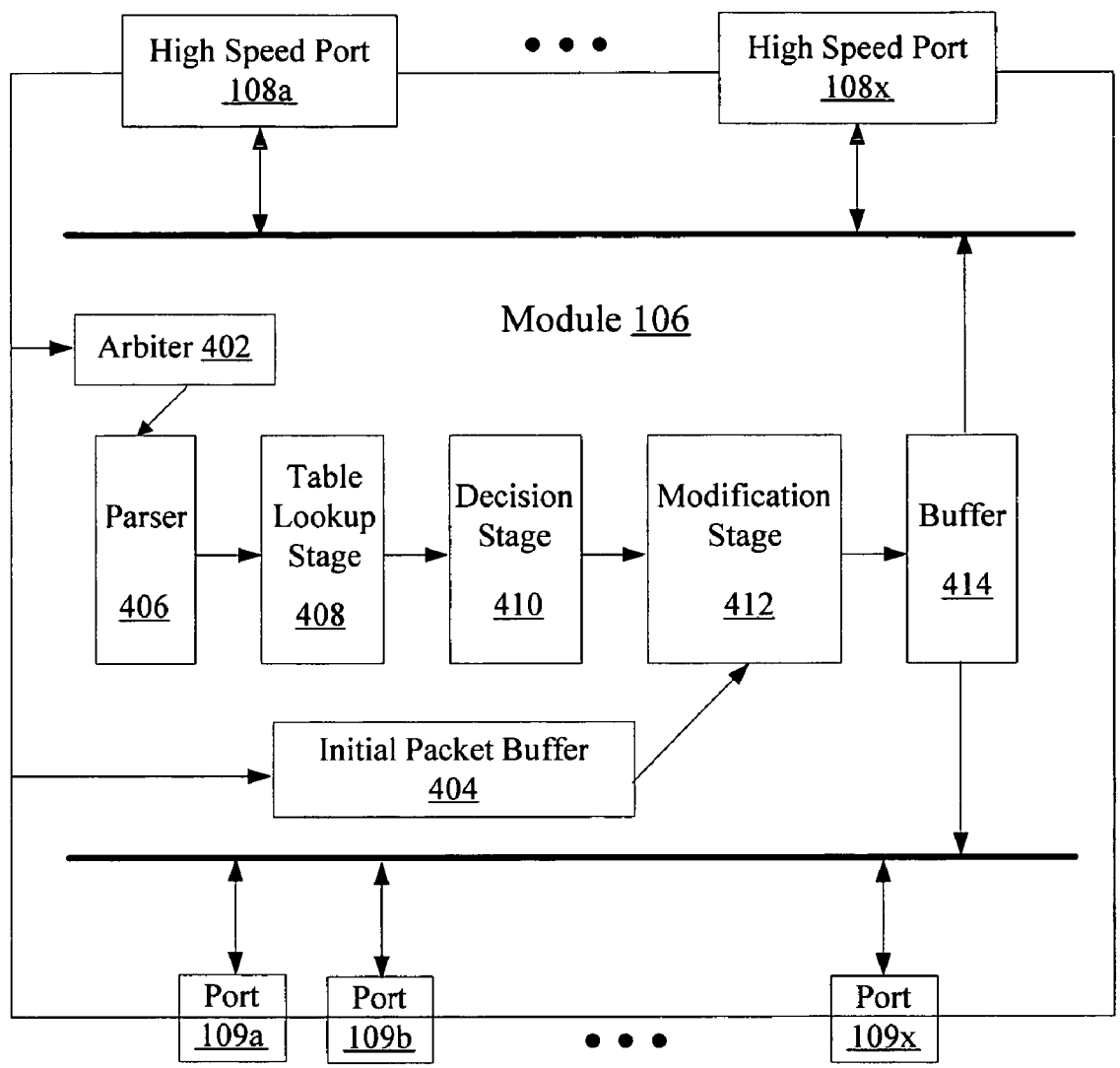
FIG. 4 illustrates a centralized egress pipeline architecture of an egress stage, according to one embodiment of the present invention.

FIG. 4 illustrates a centralized egress pipeline architecture of egress stage 106. The egress pipeline includes an arbiter 402, parser 406, a table lookup stage 408, a decision stage 410, a modification stage 412 and a data buffer 414. The arbiter 402 provides arbitration for accessing egress pipeline resources between packet data and control information from MMU and information from the CPU. Parser 406 performs packet parsing for table lookups and modifications. Table lookup stage 408 performs table lookups for information transmitted from parser 406. Decision stage 410 is used for deciding whether to modify, drop or otherwise process the packet. Modification stage 412 makes modification to the packet data based on outputs from previous stages of the ingress module.

All incoming packet data from the MMU 104 is transmitted to an initial packet buffer 404. In an embodiment of the invention, the initial packet buffer is 1044 bits wide and 18 words deep. The egress pipeline receives two inputs, packet data and control information from the MMU 104 and CPU operations from the s-bus. The initial packet buffer 404 stores packet data and keeps track of any empty cycles coming from MMU 104. Initial packet buffer 404 outputs its write address and parser 406 passes the latest write address with pipeline instructions to modification stage 414.

The arbiter 402 collects packet data and control information from the MMU 104 and read/write requests to registers and memories from the CPU and synchronizes the packet data and control information from MMU 104 and writes the requests from the CPU in a holding register. Based on the request type from the CPU, the arbiter 402 generates pipeline register and memory access instructions and hardware table initialization instructions. After arbiter 402 collects packet data, CPU requests and hardware table initialization messages, it generates an appropriate instruction. According to an embodiment, arbiter 402 generates a Start Cell Packet instruction, an End Cell of Packet instruction, a Middle Cell of Packet instruction, a Start-End Cell of Packet instruction, a Register Read Operation instruction, a Register Write Operation instruction, Memory Read Operation instruction, a Memory Write Operation instruction, a Memory Reset Write Operation instruction, a Memory Reset Write All Operation instruction and a No Operation instruction. Egress pipeline resources associated Start Cell Packet instructions and Start-End Cell of Packet instructions are given the highest priority by arbiter 404. End Cell of Packet instructions, Middle Cell of Packet instructions, Register Read Operation instructions, Register Write Operation instructions, Memory Read Operation instructions and Memory Write Operation instruction receive the second highest priority from arbiter 404. Memory Reset Write Operation instructions and Memory Reset Write All Operation instructions receive the third highest priority from arbiter 404. No Operation instructions receive the lowest priority from arbiter 404.

After receiving an instruction from arbiter 404, parser 406 parses packet data associated with the Start Cell of Packet instruction and the Start-End Cell of Packet instruction using the control information and a configuration register transmitted from arbiter 406. According to an embodiment, the packet data is parsed to obtained L4 and L3 fields which appear in the first 148 bytes of the packet.

Figure 5:
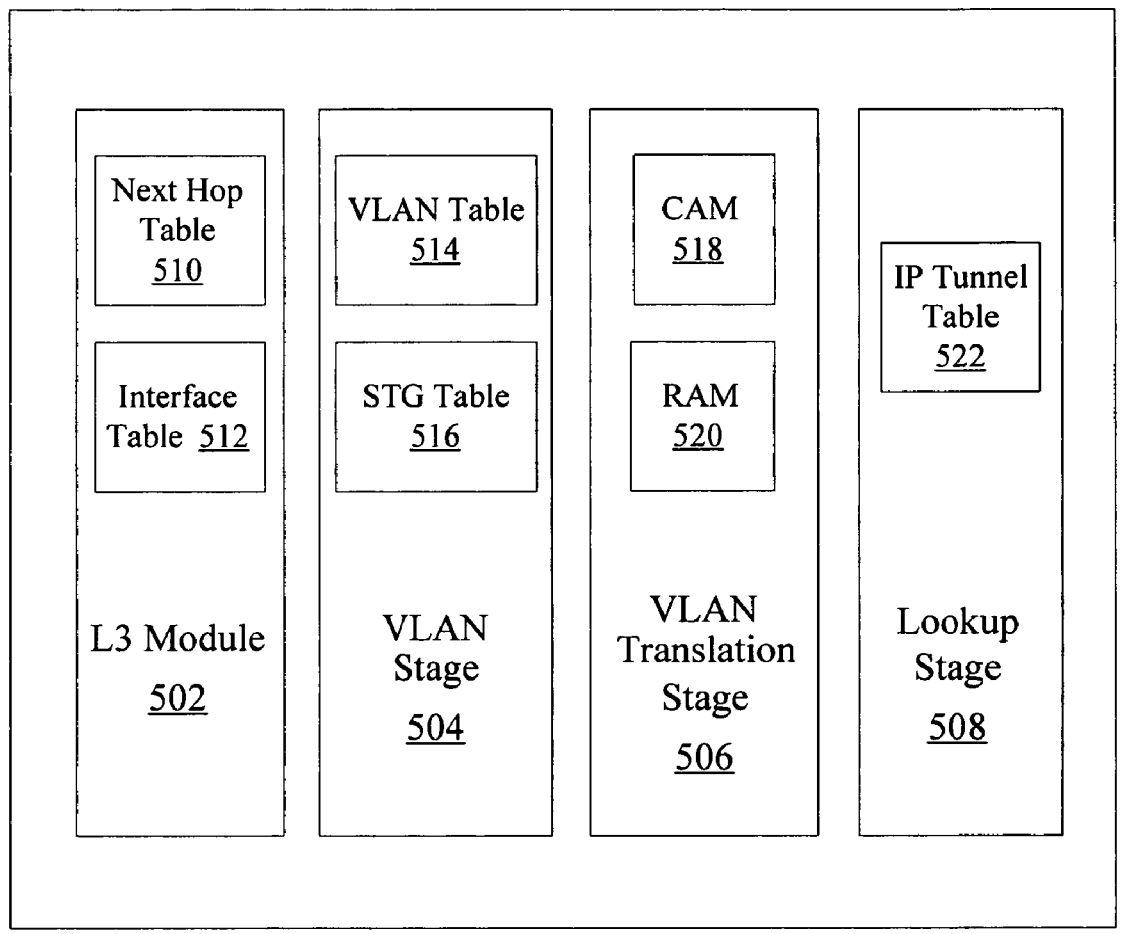
FIG. 5 illustrates an embodiment of a table lookup stage, according to one embodiment of the present invention.

Table lookup stage 408 then receives all packet fields and register values from parser 406. FIG. 5 further illustrates table lookup stage 408. Table lookup stage 408 includes a L3 Module 502, a VLAN stage 504, a VLAN translation stage 506, IP tunneling lookup stage 508. In an embodiment of the invention, L3 Module 502 includes an 8 k deep Next Hop Table 510 and a 4K deep Interface table 512. Next Hop table 510 is indexed based on a 13 bit wide next hop index from the MMU 104 and Next Hop table 510 provides a MAC Address and an Interface Number that is used, depending on the type of packet, to index Interface table 512. For all Memory Read Operation and Memory Write Operation instructions, table lookup stage 408 decodes the address and writes or reads data from corresponding tables.

VLAN stage 504 is used to obtain VLAN related information and a spanning tree state of an outgoing port. VLAN stage 504 includes a VLAN table 514 and a stage (STG) table 516. VLAN table 514 is indexed based on the VLAN IDS from either the packet or Interface table 512. If a VLAN table lookup results in a "miss", i.e., an invalid VLAN, then the packet may be dropped. If the VLAN entry is valid but the outgoing port is not a member of the VLAN, then the packet may also be dropped. The VLAN table outputs a VLAN membership, untagged bitmap, and a STG group number which is used to index STG table 516. STG table 516 outputs an STG vector which contains the spanning tree state of the outgoing ports. VLAN stage 504 also determines whether the packet should be modified in egress pipeline for CPU and ingress mirroring cases.

VLAN translation stage 506 translates the incoming VLAN to a new one and searches various tables. VLAN translation stage 506 includes a Content Addressable Memory (CAM) 518 and an associated Data Random Addressable Memory (RAM) 520. CAM 518 is searched with the VLAN ID and the destination port number and if an associated entry is found, an address is obtained from CAM 518 to access the associated Data RAM 520.

IP tunneling lookup stage 508 obtains a partial Tunnel IP header from appropriate tables, registers and parsed packet fields. IP tunneling lookup stage 508 includes an IP tunnel table 522 that is indexed issuing a tunnel index from interface table 512 and outputs tunnel type, among other information, which is used to distinguish among tunnel protocols that are implemented in an egress pipeline.

Information from table lookup stage 406 is then transmitted to decision stage 410 where a decision is made as to whether to modify, drop or otherwise process the packet. For example, decision stage 410 first looks for flush bits at the beginning of the packet transmission and if the flush bits are set, the packets are marked "dropped". In an embodiment of the invention, if a flush bit for a packet is set for a packet already in transmission, the packet is completely transmitted and the next packet is flushed. In another example, MMU 104 may mark packets as Purge, Aged or Cell Error and decision stage 410 may either drop or transmit these packets but mark them as erroneous. In another example, if a VLAN translate feature is enabled, but there was a miss in CAM 518 lookup, the decision stage 410 may drop the packet if certain fields are set. Decision stage 408 also determines if the packet needs to be L4 switched or L3 routed and the type of mirroring actions that need to be performed on the packet.

Modification stage 412 thereafter constructs a Tunnel IP Header and a module header for the packet, makes replacement changes in the packet and computes IP checksum for outer and inner IP headers. Modification stage 412 receives a packet data interface from the initial buffer 404 which enables modification stage 401 to provide a read address to initial buffer 404 and in response obtain the packet data and basic control data. Modification stage 412 then generates Middle of Packet and End of Packet instructions based on the data received from initial buffer 404 and makes changes based on these commands. Modification stage 412 also receives all packet decisions and pipeline commands decision stage 410 and uses this information to make further changes to the packet. Specifically, all fields of the tunnel IP header which need to be filled by incoming packet fields are filled.

Furthermore, an IP checksum for a tunnel IP header is computed in parallel with the header construction. Modification stage 412 further reads back packets and control information from initial buffer 404 and performs all packet modifications and replacements of fields. It outputs CPU operations and hardware commands and data and addresses associated with them on one bus and outputs packet data and control information on another bus. Additionally, modification stage 412 performs physical encapsulation and de-capsulation of headers and tag removal and insertions. If a packet is going to a high speed port, modification stage 412 converts the packet from Ethernet format to high speed format. Modification stage 412 also aligns the packet by padding packets smaller than 64 bytes and removes holes by aligning data to a 1314 bit boundary. Thereafter, a 1314 bit "complete" data word is outputted from modification stage 412 to the data buffer 414.

Data buffer 414 stores completed data words from modification stage 412 in memory. Before the egress pipeline sends packets out to destination ports 109a-109x, the packet data are stored in the data buffer 414 for pipeline latency and port speed matching. Data buffer 414 is capable of requesting data from MMU 104 whenever it has a free space.

Different types of mirroring can accommodate the needs of mirroring as it is used today. These types of mirroring include ingress mirroring, egress mirroring and MAC-based (i.e. address-based) mirroring. In the case of ingress mirroring, an unmodified packet is forwarded to the mirrored-to port, and the latter two types receive a modified packet. In specific embodiments, up to four mirrored-to ports may be selected for both ingress and egress mirroring.

Figures 6, 7:
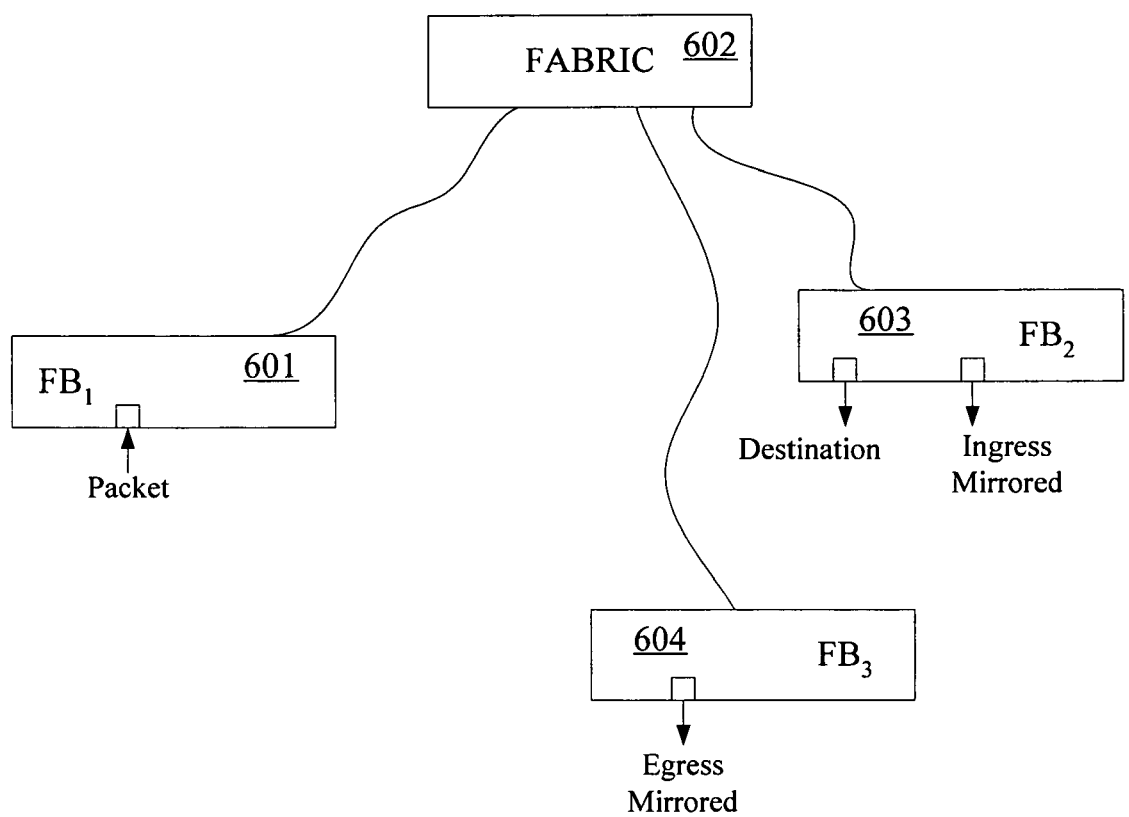
FIG. 6 illustrates a configuration of network devices and the mirroring of data, according to one embodiment of the present invention.
FIG. 7 illustrates a table that is used to provide mirroring of data, according to one embodiment of the present invention.

Tables, as shown in FIG. 7, are used to effectuate the mirroring process. For a given port, the L2 lookup process, as discussed above, provides mirroring information and determines when a mirror index table should also be used. The mirror index table is read to determine mirroring ports, which may also be specified as a trunk group ID. According to one embodiment, for each ingress port, one Ingress Mirror to Port can be specified. For each egress port, one Egress Mirror to Port can be specified. One Not-Unicast Mirror to Port can also be specified. When a packet is received from one ingress port to one egress port, Ingress Mirror to Port will be picked up according to its ingress port. Egress Mirror port will be picked up according to its egress port. For a multicast packet, since the packet is destined for multiple egress ports, each could have one egress mirror to port specified. The Not-Unicast Mirror to Port will be picked up according to its ingress port instead of sending multiple egress mirror packets to different egress ports.

Thus, for L2 switched packets, as shown in FIG. 6, the packet is received on the $FB_1$ network device 601, and its destination address is determined through an address resolution process, as discussed above. Assuming that ingress port is mirrored and the destination port is also mirrored, the unmodified packet is forwarded to the mirrored-to port on network device FB2 603 through the switch fabric 602. A mirror to port is not required to be in the same $FB_1$ 601, but can be specified in a remote $FB_2$ 603 or $FB_3$ 604 in the same fabric 602. A modified packet is also sent to $FB_2$ 603, which is the destination address for the packet. A copy of the modified packet is also sent to $FB_3$ 604, which contains the egress mirrored-to-port. In certain embodiments, $FB_1$ 601 can have four Ingress Mirror to Ports specified. In certain embodiments, a total of four Egress Mirror to Ports, where either mirror-to-port can be part of a trunk group.

As discussed above and illustrated in FIG. 6, three versions of the packet are sent through a series of switches. A first is a modified version of the packet that is sent to the destination port of switch 603. The header of the original packet is modified when the packet is sent out an egress port of device 601 to reach its ultimate destination. Since the destination port has a mirrored-to-port, Egress Mirrored, on device 604, a copy of the modified packet is also sent out that mirrored-to-port. Lastly, since the ingress port on device 601 is also mirrored, an unmodified packet is sent to Ingress Mirrored port on device 603.

When a packet is received by an MMU, the MMU stores only one copy of this packet in Cell Buffer Pool and one copy inside the egress port Transmit Queue. The MMU replicates this entry to send out needed copies to the egress pipe. This packet's packet pointer is keep in Transmit Queue until all the needed copies have been sent to the Egress Pipe. The MMU first sends out the normal switch packet and flags it as a SWITCH packet. After finish transmitting the first packet, the MMU sends out a second packet and marks it as an Ingress Mirrored packet. The Egress Pipe will not modify this packet according to this Mark out. At the end, the MMU will send out the last packet and mark it as an Egress Mirror Packet. The Egress Pipe will modified this packet as a Modified packet. After all packets are sent, the packet pointer will be released from the Transmit Queue and the packet's copy in Cell Buffer Pool will be removed.

Returning to the above discussed embodiment, for the multicast ingress packet received in the FABRIC 602, FB 601 will send out Ingress and Egress Mirror Packets marked as a unicast packet and no longer as a multicast packet. Therefore, there is only one Ingress and one Egress Packet that can be generated within FABRIC 602.

While the above-discussed embodiment illustrates both ingress and egress mirroring over a series of devices, the present invention is also applicable to mirroring of ports of a device to a mirrored-to-port on the same device. It is also applicable to one type of mirroring, i.e. egress, ingress or MAC-based, without use of other types of mirroring in the same device.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

With respect to the present invention, network devices may be any device that utilizes network data, and can include switches, routers, bridges, gateways or servers. In addition, while the above discussion specifically mentions the handling of packets, packets, in the context of the instant application, can include any sort of datagrams, data packets and cells, or any type of data exchanged between network devices.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for processing packets, the network device comprising:
    an ingress module configured to perform switching functions on an incoming packet;
    a memory management unit configured to store packets and perform resource checks on each packet; and
    an egress module configured to:
        perform packet modification and transmit a modified packet to an appropriate egress port;
        send an unmodified version of the incoming packet to an ingress mirrored-to-port when an ingress port, upon which the incoming packet is received, is configured to mirror packets received by the ingress port; and
        perform lookups of both an ingress mirror index table and an egress mirror index table to determine at least one of the ingress mirrored-to-port and an egress mirrored-to-port.

2. The network device according to claim 1, wherein the egress module is further configured to forward a copy of the modified packet to an egress mirrored-to-port, when the appropriate egress port is configured to mirror packets transmitted by the appropriate egress port.

3. The network device according to claim 1, wherein the egress module is further configured to perform a lookup of a mirror table to determine the ingress mirrored-to-port.

4. The network device according to claim 3, wherein the ingress mirrored-to-port is obtained from a trunk group identifier.

5. The network device according to claim 1, wherein the egress module is further configured to forward a copy of the modified packet to an address-based mirrored-to-port, when a port having a specific address is configured to mirror packets transmitted by the port.

6. The network device according to claim 1, further comprising a plurality of ports and at least one port configured to communicate with an external processing unit, wherein the network device interfaces with the external processing unit through a CPU processing module that is connected to the at least one port configured to communicate with the external processing unit.

7. The network device according to claim 1, wherein the egress module is further configured to forward the modified packet to a not-unicast mirrored-to-port when the packet is a multicast packet.

8. The network device according to claim 1, wherein the memory management module is further configured to replicate the modified or incoming packet based on the number of packets to be forwarded.

9. A method for processing packets in a network device, the method comprising:
    receiving an incoming packet;
    storing the incoming packet;
    performing resource checks on the incoming packet;
    modifying the incoming packet to form a modified packet;
    transmitting the modified packet to an appropriate egress port,
    sending an unmodified version of the incoming packet to an ingress mirrored-to-port when an ingress port, upon which the incoming packet is received, is configured to mirror packets received by the ingress port; and
    performing lookups of both an ingress mirror index table and an egress mirror index table to determine at least one of the ingress mirrored-to-port and an egress mirrored-to-port.

10. The method according to claim 9, further comprising forwarding a copy of the modified packet to an egress mirrored-to-port, when the appropriate egress port is configured to mirror packets transmitted by the appropriate egress port.

11. The method according to claim 10, wherein forwarding the copy of the modified packet comprises forwarding the copy of the modified packet to a not-unicast mirrored-to-port when the modified packet is a multicast packet.

12. The method according to claim 11, wherein the ingress mirrored-to-port is obtained from a trunk group identifier.

13. The method according to claim 9, further comprising performing a lookup of a mirror table to determine the ingress mirrored-to-port.

14. The method according to claim 9, wherein receiving the incoming packet comprises receiving the incoming packet through a plurality of ports and at least one port for communicating with an external processing unit.

15. The method according to claim 9, wherein the method further comprises replicating the modified or incoming packet based on the number of packets to be forwarded.

16. An apparatus for processing packets in a network device, the apparatus comprising:
    receiving means for receiving an incoming packet;
    storing means for storing the incoming packet;
    checking means for performing resource checks on the incoming packet;
    modifying means for modifying the incoming packet to form a modified packet;
    transmitting means for transmitting the modified packet to an appropriate egress port;
    sending means for sending an unmodified version of the incoming packet to an ingress mirrored-to-port when an ingress port, upon which the incoming packet is received, is configured to mirror packets received by the ingress port; and
    lookup means for performing a lookup of a mirror table to determine the ingress mirrored-to-port, wherein the lookup means comprises means for performing lookups of both an ingress mirror index table and an egress mirror index table to determine at least one of the ingress mirrored-to-port and an egress mirrored-to-port.

17. The apparatus according to claim 16, further comprising forwarding means for forwarding a copy of the modified packet to an egress mirrored-to-port, when the appropriate egress port is configured to mirror packets transmitted by the appropriate egress port.

18. The apparatus according to claim 16, wherein the ingress mirrored-to-port is obtained from a trunk group identifier.

19. The apparatus according to claim 16, wherein the receiving means comprises means for receiving the incoming packet through a plurality of ports and at least one port for communicating with an external processing unit.

* * * * *